US008857060B2

(12) United States Patent
Singh et al.

(10) Patent No.: US 8,857,060 B2
(45) Date of Patent: *Oct. 14, 2014

(54) CROSSMEMBER CENTER SECTION

(75) Inventors: Niranjan Singh, Ann Arbor, MI (US); Patrick DiMarco, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1234 days.

This patent is subject to a terminal disclaimer.

(21) Appl. No.: 12/750,026

(22) Filed: Mar. 30, 2010

(65) Prior Publication Data
US 2010/0180444 A1     Jul. 22, 2010

Related U.S. Application Data

(62) Division of application No. 11/700,233, filed on Jan. 31, 2007, now Pat. No. 7,717,220.

(51) Int. Cl.
*B21D 53/88* (2006.01)
*B60G 3/12* (2006.01)
*B60G 7/02* (2006.01)

(52) U.S. Cl.
CPC .............. *B60G 7/02* (2013.01); *B60G 2204/14* (2013.01)
USPC .................. 29/897.2; 280/124.128; 180/312

(58) Field of Classification Search
USPC ............ 180/312; 248/250; 280/785, 124.128, 280/124.116, 124.106; 29/897.2
See application file for complete search history.

(56) References Cited

U.S. PATENT DOCUMENTS

| | | | |
|---|---|---|---|
| 2,939,540 A | 6/1960 | Halberg et al. | |
| 3,292,968 A | 12/1966 | Hilabrand et al. | |
| 3,806,149 A | 4/1974 | Huszar | |
| 5,660,428 A | 8/1997 | Catlin | |
| 5,700,033 A | 12/1997 | Beckman | |
| 5,906,347 A * | 5/1999 | Noland | 248/250 |
| 6,470,990 B1 * | 10/2002 | Panoz | 180/311 |
| 6,698,775 B2 | 3/2004 | Ness | |
| 7,140,530 B2 * | 11/2006 | Durand et al. | 228/234.1 |
| 2001/0022444 A1 | 9/2001 | Lapic | |
| 2002/0050706 A1 * | 5/2002 | Mikasa et al. | 280/788 |
| 2003/0000762 A1 | 1/2003 | Lecuit | |
| 2005/0104356 A1 | 5/2005 | Vincenti | |
| 2006/0012162 A1 | 1/2006 | Werner et al. | |
| 2007/0045034 A1 | 3/2007 | Kim | |
| 2007/0071587 A1 | 3/2007 | Baumann et al. | |

OTHER PUBLICATIONS

Hawaii Racing Draveshaft Safety Loop, Retrieved from www.archive.org Sep. 2013. Dated Nov. 13, 2006. 1 Page.*

(Continued)

*Primary Examiner* — David Bryant
*Assistant Examiner* — Jacob Cigna
(74) *Attorney, Agent, or Firm* — Jones Robb, PLLC; Raymond L. Coppiellie

(57) ABSTRACT

A center section for a crossmember of a vehicle chassis comprises a driveshaft hoop, crossmember attachment areas extending generally from opposing sides thereof, and trailing arm mounts on either side of the driveshaft hoop for attachment of one or more trailing arms to the center section. The crossmember attachment areas have heights that allow attachment of crossmember portions to the center section at offset heights. A method of constructing a crossmember of a vehicle chassis comprises providing a center section having crossmember attachment areas of predetermined heights extending generally from opposite sides of a driveshaft hoop, and attaching crossmember portions within the crossmember attachment areas at heights that are offset from each other.

16 Claims, 6 Drawing Sheets

(56) References Cited

OTHER PUBLICATIONS

Nico Club Internet Message Forums, Message by user Scotty-2-forty, dated Feb. 3, 2011. Retrieved Sep. 2013. 3 Pages.*

NASCAR Truck Racing Rulebook for 2006 Season, National Association for Stock Car Auto Racing, Inc., 2005, p. 67.
NASCAR Truck Racing Rulebook for 2009 Season, National Association for Stock Car Auto Racing, Inc., 2009.

* cited by examiner

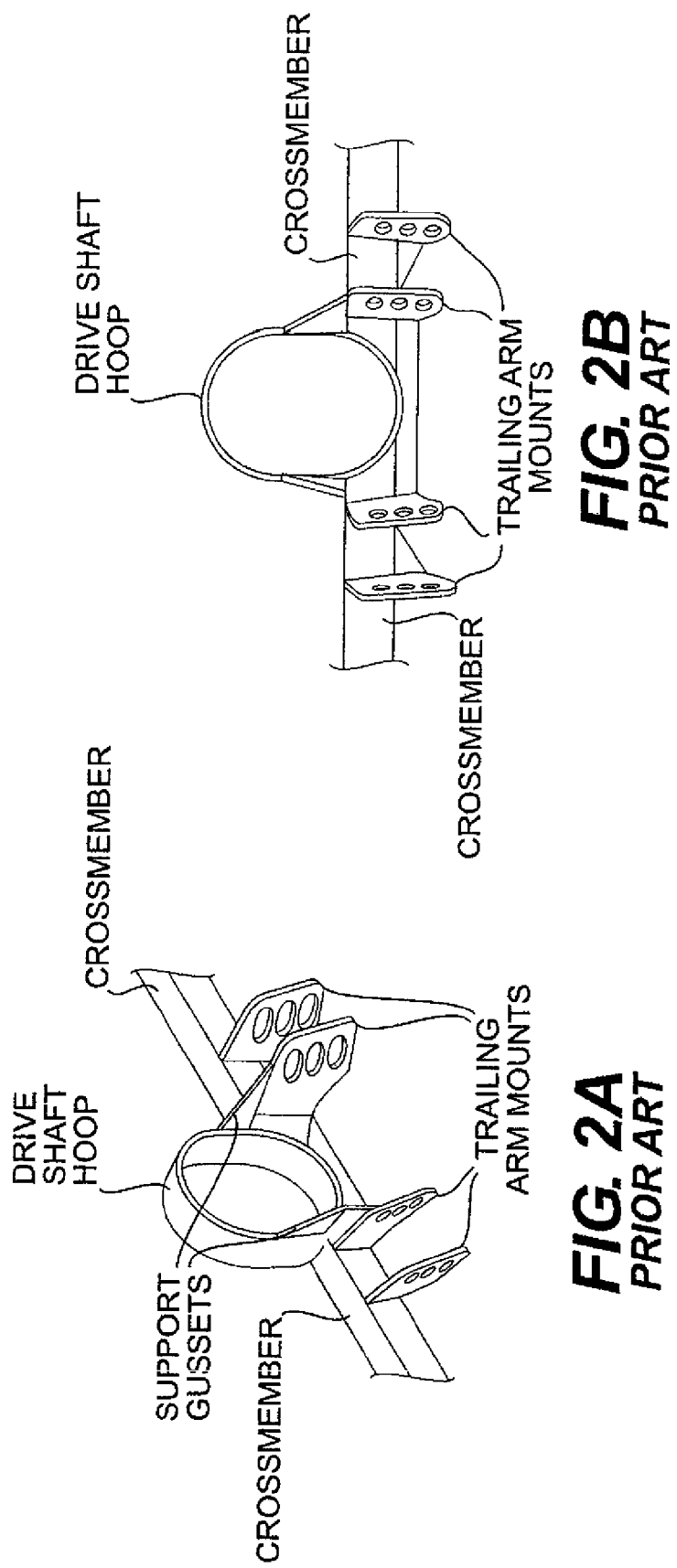

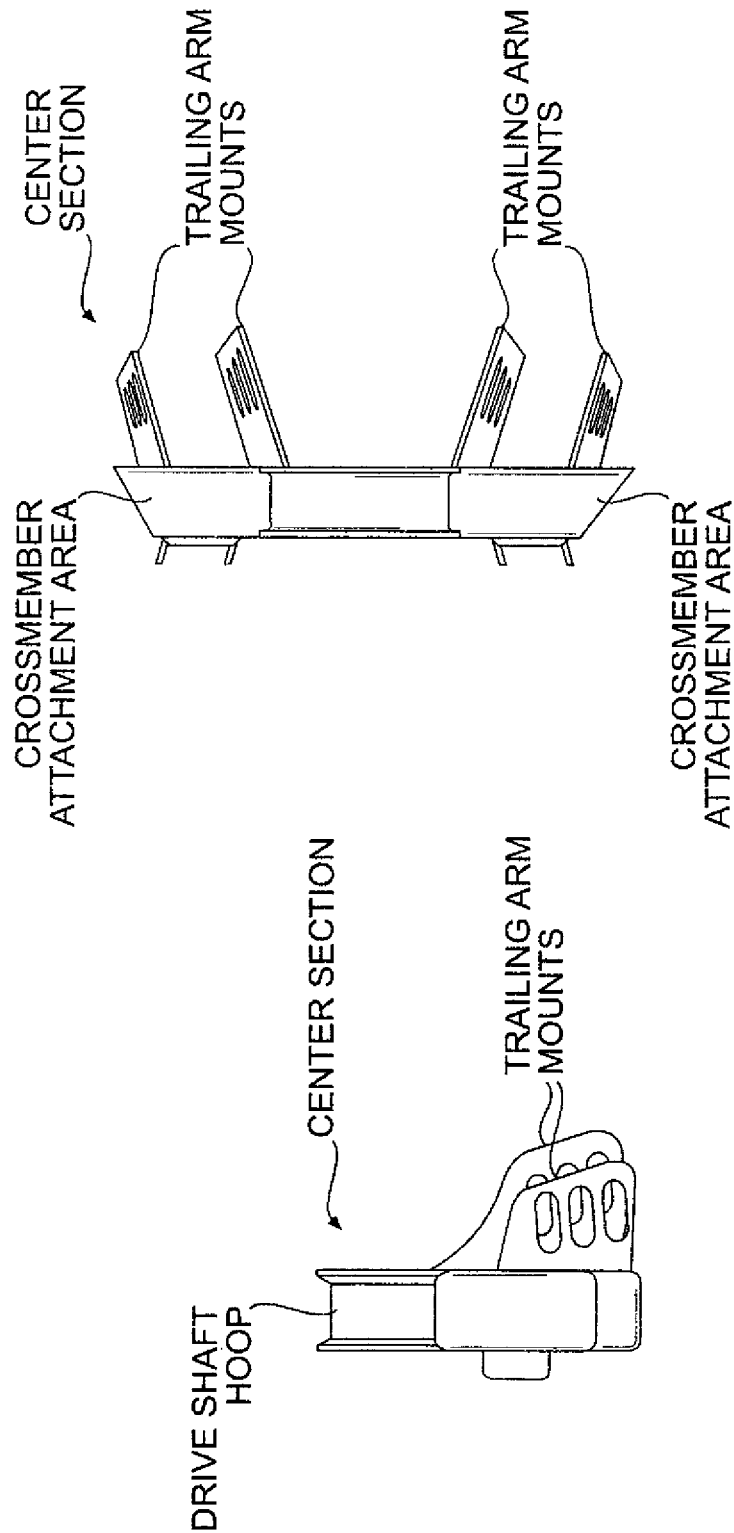

CROSSMEMBER CENTER SECTION

This is a division of U.S. patent application Ser. No. 11/700,233, filed Jan. 31, 2007 now U.S. Pat. No. 7,717,220, which is incorporated herein by reference in its entirety.

FIELD OF THE INVENTION

This invention relates to an improved crossmember for a vehicle. More specifically, this invention relates to a center section of a vehicle crossmember that is common for different frame rail heights.

BACKGROUND OF THE INVENTION

NASCAR racecars are primarily built in a two-step process. The first step is construction of the chassis, which consists of a central roll cage, a front clip, and a rear clip. A typical chassis is illustrated in FIG. 1. The second step is attachment of an outer body shell to the chassis. The chassis is constructed of round and square rails with varying thicknesses and dimensions. The size and shape of most of the rails (also called "tubes") used in the chassis is strictly mandated by the NASCAR sanctioning organization.

Construction of the chassis is itself a four-step process. First, the trailing arm crossmember (TACM) is constructed and is used to set the reference frame of the car. In other words, application of all of the subsequent parts in the chassis is based on the dimensions and position of the TACM. The next step is building the front and rear clips that attach to the main longitudinal frame rails. The front and rear clips are constructed according to suspension "hard points" requirements of each team. The frame rails are also built to suit the heights required for different speedways. Different corners of a vehicle chassis can have different resting heights depending on the requirements of a given speedway. In the third step, the central roll cage is constructed. The roll cage consists entirely of round tubes of varying sizes and thicknesses. Lastly, the firewalls, floor pans, and roll cage are attached to the frame rails and the front and rear clips to complete the chassis. Traditional welding techniques are used according to NASCAR specifications during chassis construction.

Due to varying frame rail height requirements and because all of the subsequent parts in the chassis are dependent on the dimensions of the TACM, the construction of the TACM is an important step in the chassis construction process. The TACM consists of, as illustrated in FIGS. 2A-2D, a driveshaft hoop, trailing arm (also called "truck arm") mounts, and the crossmember portions that attach to the frame rails. Support gussets may be use to strengthen the crossmember. Because the shape of the TACM changes for different frame rail heights and may require offset heights of crossmember portions, chassis construction must be changed for each configuration of the chassis. The height of the crossmember can be described as its distance from the ground when in use. This can also be referred to as vertical height of the crossmember. Also, the crossmember is cut and trimmed separately for each configuration. This can increase the cost, timing, and consistency of the TACM.

A trailing arm suspension is a vehicle suspension that includes one or more arms that are connected between the axle and the chassis (here, the crossmember of the chassis). The arms generally extend from the rear axle to a location on the chassis (the crossmember) that is forward thereof. Two arms are usually used.

SUMMARY OF THE INVENTION

The invention relates to a center section for a crossmember of a vehicle chassis comprising a driveshaft hoop, crossmember attachment areas extending generally from opposing sides thereof, and trailing arm mounts on either side of the driveshaft hoop for attachment of one or more trailing arms to the center section. The crossmember attachment areas have heights that allow attachment of crossmember portions to the center section at offset heights.

The invention also relates to a method of constructing a crossmember of a vehicle chassis comprising providing a center section having crossmember attachment areas of predetermined heights extending generally from opposite sides of a driveshaft hoop, and attaching crossmember portions within the crossmember attachment areas at heights that are offset from each other.

The invention further relates to a method of manufacturing a center section of a crossmember of a vehicle chassis comprising providing crossmember attachment areas extending generally from opposing sides of a driveshaft hoop, and providing trailing arm mounts on either side of the driveshaft hoop for attachment of one or more trailing arms to the center section. The crossmember attachment areas have heights that allow attachment of crossmember portions to the center section at offset heights.

The invention may include the heights of the crossmember attachment areas being offset from each other, the center section comprising cast steel, and/or the crossmember portions being inserted into the crossmember attachment areas at the desired heights and then welded within the crossmember attachment areas.

BRIEF DESCRIPTION OF THE DRAWINGS

The accompanying drawings, which are incorporated herein and form part of the specification, illustrate the prior art and the present invention and together with the description, further serve to explain the principles of the invention and to enable a person skilled in the pertinent art to make and use the invention.

FIG. 2A is a perspective view of a center section of a prior art crossmember.

FIG. 2B is a front view of the center section of FIG. 2A.

FIG. 4C is a side view of the center section of FIG. 4A.

FIG. 4D is a bottom view of the center section of FIG. 4A.

DETAILED DESCRIPTION OF THE INVENTION

Figure 1:
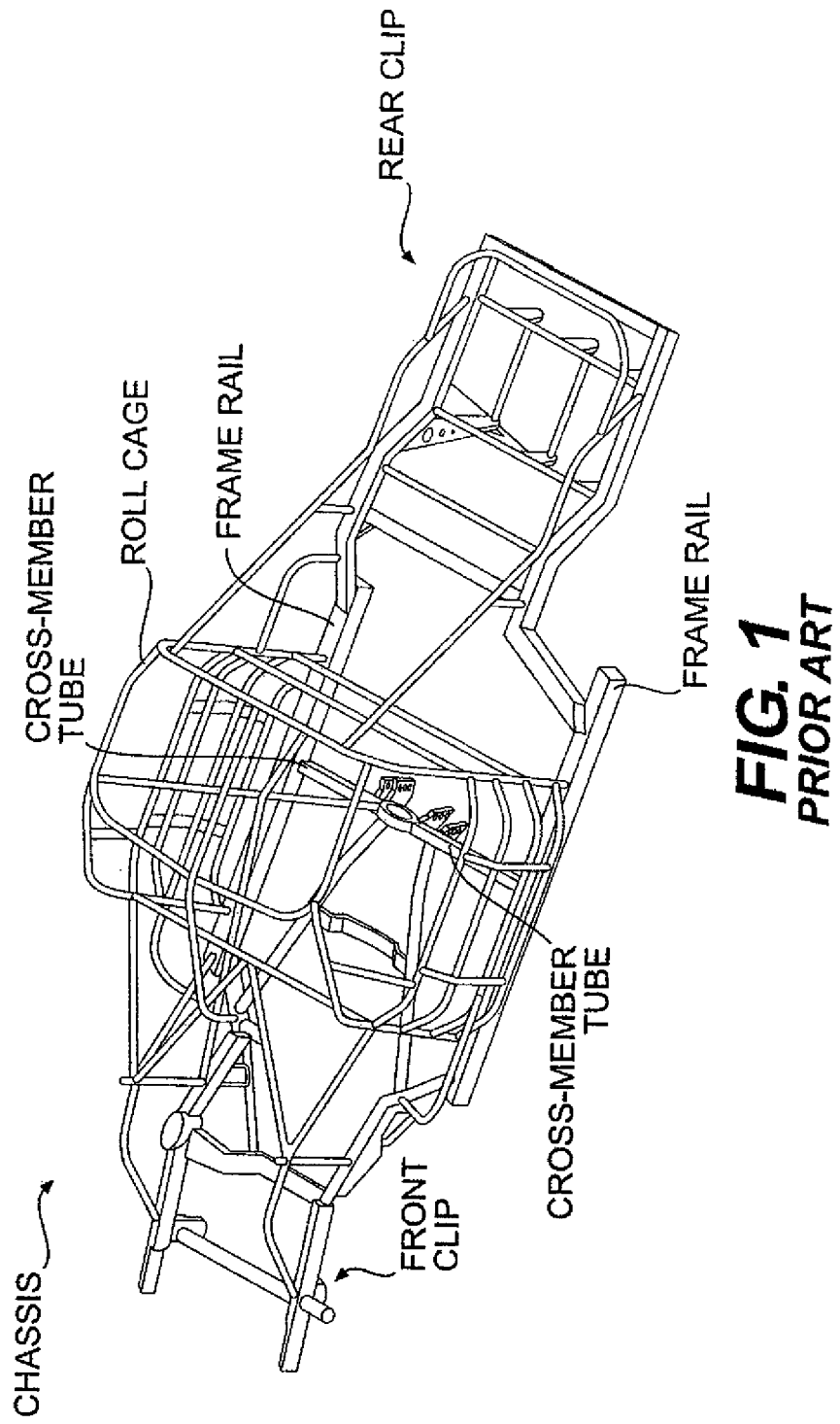
FIG. 1 is a perspective view of a prior art NASCAR racecar chassis.
Figure 2D:
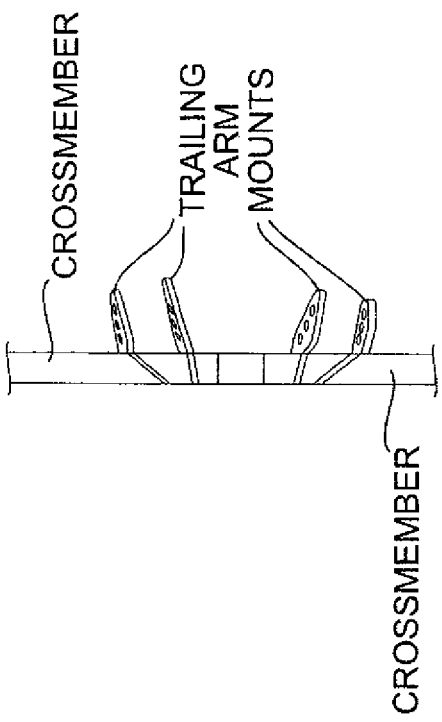
FIG. 2D is a bottom view of the center section of FIG. 2A.
Figure 2C:
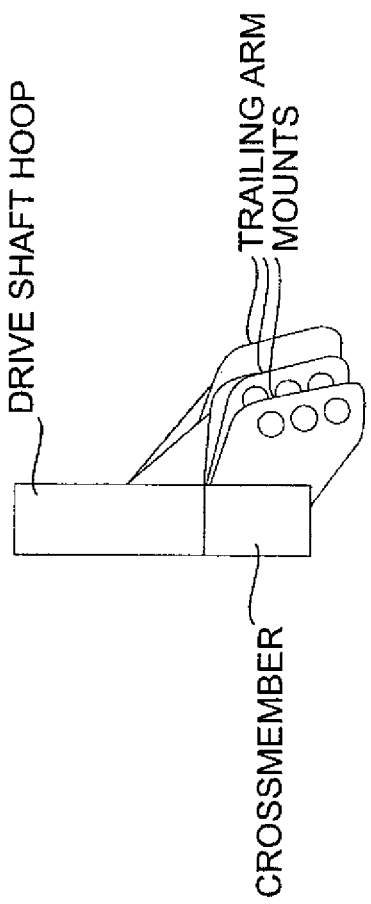
FIG. 2C is a side view of the center section of FIG. 2A.
Figure 3:
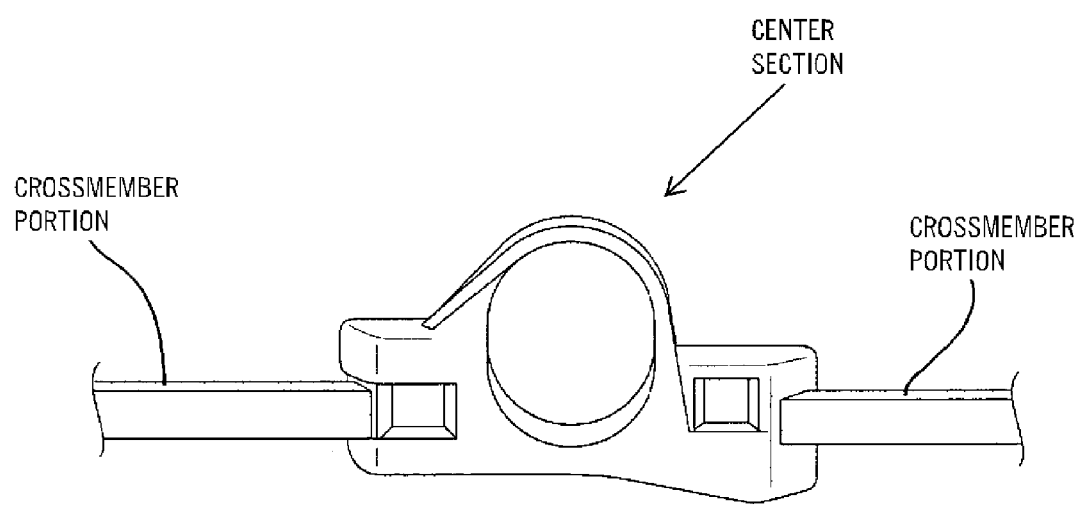
FIG. 3 illustrates an embodiment of a crossmember center section of the present invention, attached to the rest of the crossmember.
Figure 4A:
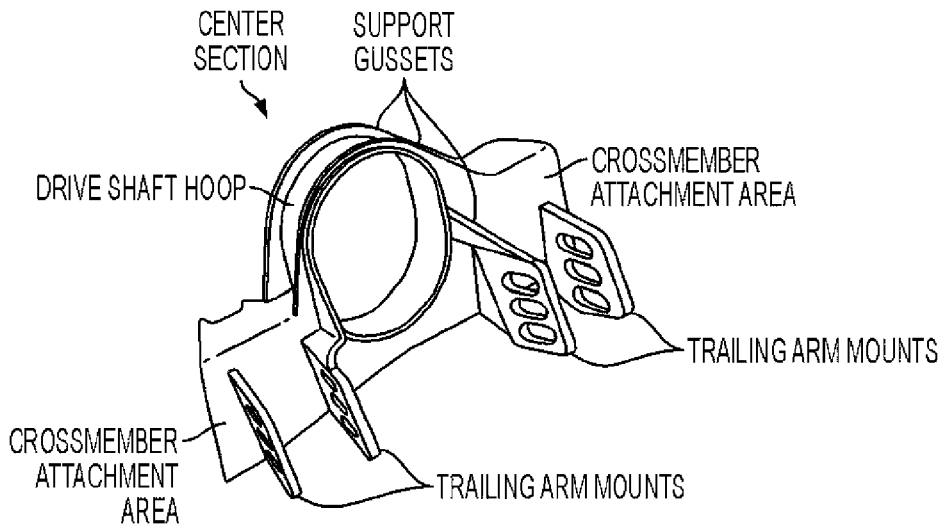
FIG. 4A is a perspective view of an embodiment of a crossmember center section of the present invention.
Figure 4B:
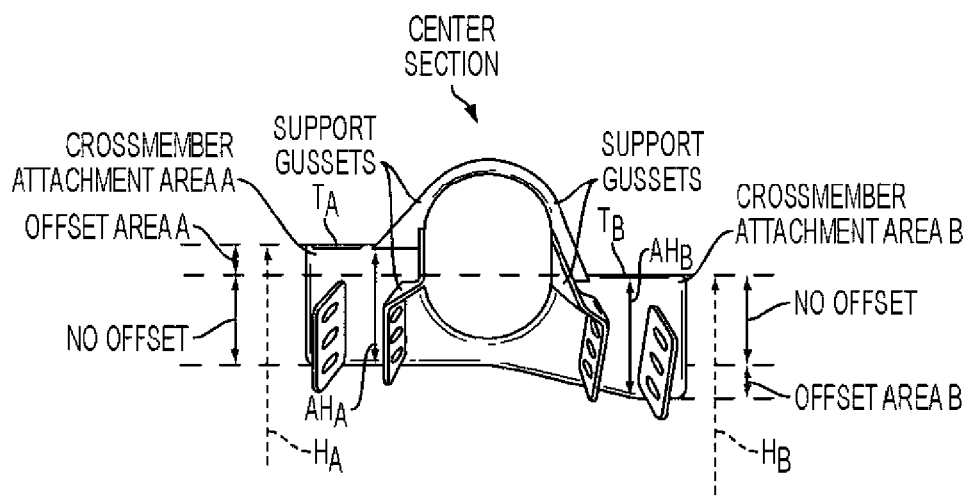
FIG. 4B is a front view of the center section of FIG. 4A.

In accordance with an embodiment of the present invention, a center section of a TACM is used to accommodate a variety of frame rail heights that are necessary based on varying NASCAR speedway requirements. The square crossmember tubes extending between chassis frame rails (see FIG. 3) can be adjusted within the center section to accommodate differing frame rail heights and resulting differences in crossmember heights. Thus, the height of a crossmember attached to one side of the center section need not have the same height as a crossmember attached to the other side of the center section. As can be seen in FIGS. 3 and 4B, the crossmember attachment sections of the center section are offset to facilitate offset heights of the crossmembers. Thus, a fixed height of the center section accommodates a variety of heights for the crossmembers. In stating that the heights of the crossmember attachment sections of the center section are offset, the present invention contemplates a portion of the crossmember attachment sections of the center section being offset. In a case where the intended speedways would never require the crossmember to have a uniform height, the present invention also contemplates the crossmember attachment sections of the center section being completely offset—that is, having no overlap in height.

It is to be understood that the crossmembers will not always be offset. For example, on a road course like Watkins Glen International Speedway in New York, the crossmembers will not be offset. However, on an oval track with high banking like Bristol Motor Speedway in Tennessee, the crossmembers are offset. The amount of offset and height variation accommodated by the crossmember attachment areas of a center section in accordance with the present invention preferably allows a single center section to be used in all variations of NASCAR speedways—without the crossmember needing to be cut and trimmed separately for each configuration. Thus, the height of the crossmember attachment areas may vary, along with the offset, and remain within the scope of the invention. FIG. 3 illustrates offset crossmembers attached to an embodiment of a center section. This exemplary embodiment does not specifically illustrate trailing arm mounts on the center section.

Thus, a single center section can be use for all configurations without requiring cutting, trimming, or welding. This can reduce construction time significantly because of the reduced number of subcomponents compared with traditional methods of manufacturing TACMs. Also, having a common center section among configurations increases the build consistency among chassis. Because the amount of welding is reduced, the possibility of resulting local metal warping can also be reduced. The center section comprises a suitable strong material such as cast steel, aluminum, other metals, or carbon fiber.

During a race, a significant load is applied to the trailing arm mounts of the TACM. This can cause prior art mounts to deform and/or crack in the areas of welding. The center section of the present invention greatly increases stiffness and strength of the mounting area by requiring less welding during construction, particularly when cast, and therefore can reduce fatigue failures such as deformation and cracking.

As discussed above, FIG. 3 illustrates an embodiment of a center section of the present invention with offset crossmembers attached to its crossmember attachment areas. As can be seen, a vehicle driveshaft will extend through the driveshaft hoop at a fixed height, and the crossmember attachment areas will facilitate a variety of crossmember attachment heights, aligned or not, given the fixed height of the center section. The trailing arm mounts can have any suitable configuration to facilitate proper mounting of the trailing arms to the center section. The illustrated embodiment shows three mounting holes to allow adjustable trailing arm attachment. More or less holes are contemplated, as are other suitable configurations for the mounting area.

FIGS. 4A-4D illustrate an embodiment of a center section of the TACM of the present invention. As shown in FIG. 4B, the center section includes crossmember attachment areas on either side of a driveshaft hoop. The crossmember attachments areas have heights $H_A$ and $H_B$, respectively. An area of "no offset" is indicated, wherein crossmember portions can be attached to the center section and have the same height. In addition to the indicated area of no offset, is an offset area A and an offset area B. Crossmember portions can be offset by varying their attachment height within the no offset area and into the offset areas A and B. For maximum offset, a crossmember portion is attached at an uppermost height in offset area A on the left side of the center section and the other crossmember portion is attached at a lowermost height in offset area B on the right side of the center section.

As stated above, the amount of offset and height variation accommodated by the crossmember attachment areas of a center section preferably allows a single center section to be used in all variations of NASCAR speedways. Thus, the height and offset of the crossmember attachment areas may vary. The present invention contemplates a variety of ways to attach the crossmember portions to the center section, such as by inserting the crossmember portions into the crossmember attachment areas at the desired heights and then welding them in place.

It is to be understood that the present invention contemplates generally a center section for a crossmember, regardless of whether the suspension is trailing arm or the way in which the chassis is attached to the suspension. The present invention is intended to accommodate driving terrain and speedways other than those sponsored by NASCAR. Indeed, the heights of the crossmember attachment areas need not be offset, but rather could provide enough height to allow crossmembers to be attached in suitably offset positions without requiring the areas themselves to be offset. Further, the present invention contemplates having only one of the crossmember attachment areas having an extended height to allow offset, with the other attachment area having a fixed point of attachment.

What is claimed is:

1. A method of constructing a crossmember of a vehicle chassis, the method comprising:
   forming a center section comprising crossmember attachment areas extending generally from opposite sides of a driveshaft hoop and having vertical heights that are offset from each other when the crossmember is in use; and
   forming two side portions;
   adjusting each side portion vertically to a desired height with respect to a respective crossmember attachment area; and
   attaching the side portions to respective crossmember attachment areas at offset heights.

2. The method of claim 1, wherein attaching the side portions includes inserting the side portions into the crossmember attachment areas at desired heights and then welding the side portions in place.

3. The method of claim 1, wherein forming the center section comprises forming the center section from cast steel.

4. The method of claim 1, wherein the center section can be used with frame rails having different heights for different roadway configurations.

5. The method of claim 1, wherein the center section can be used with frame rails having different heights for different roadway configurations without being cut and trimmed separately for each configuration.

6. The method of claim 1, wherein the side portions are configured to extend outwardly from the center section and attach to a frame rail of the vehicle chassis when the crossmember is in use.

7. The method of claim 1, wherein forming the side portions comprises forming tubes having a square cross-section.

8. The method of claim 1, wherein forming the center section further comprises forming a center section comprising trailing arm mounts.

9. A method of constructing a crossmember of a vehicle chassis, the crossmember comprising a center section having attachment areas extending from opposite sides of a driveshaft hoop, the crossmember attachment areas having vertical heights that are offset from each other when the crossmember is in use, the method comprising:

adjusting a side portion of the crossmember vertically to a desired height with respect to each crossmember attachment area such that the vertical heights of the side portions are offset from each other; and attaching a first end of each of the side portions to a respective crossmember attachment area at the vertically offset heights.

10. The method of claim 9, wherein attaching the first end of each of the side portions to a respective attachment area includes welding the first end of each of the side portions to the center section.

11. The method of claim 9, wherein the center section comprises cast steel.

12. The method of claim 9, wherein the center section can be used with frame rails having different heights for different roadway configurations.

13. The method of claim 9, wherein the center section can be used with frame rails having different heights for different roadway configurations without being cut and trimmed separately for each configuration.

14. The method of claim 9, further comprising attaching a second end of each of the side portions to a respective frame rail of the vehicle chassis.

15. A method of constructing a crossmember of a vehicle chassis, the crossmember comprising a center section having attachment areas extending from opposite sides of a driveshaft hoop, the crossmember attachment areas having vertical heights that are offset from each other when the crossmember is in use, the method comprising:

adjusting a side portion of the crossmember vertically to a desired height with respect to each crossmember attachment area; and attaching a first end of each of the side portions to a respective crossmember attachment area, wherein the center section can be used with frame rails having different heights for different roadway configurations without being cut and trimmed separately for each configuration.

16. The method of claim 15, further comprising attaching a second end of each of the side portions to a respective frame rail of the vehicle chassis.

* * * * *